Dec. 10, 1963
L. E. WESSEL
3,113,534
ROOT FEEDING TOOL AND METHOD
Filed Aug. 11, 1961
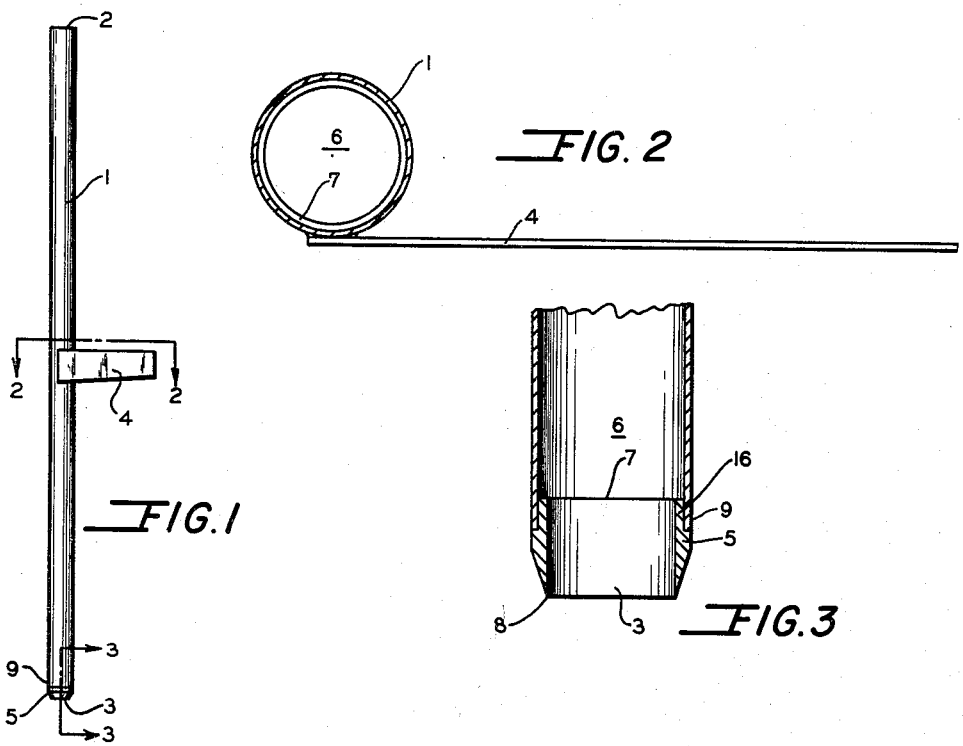
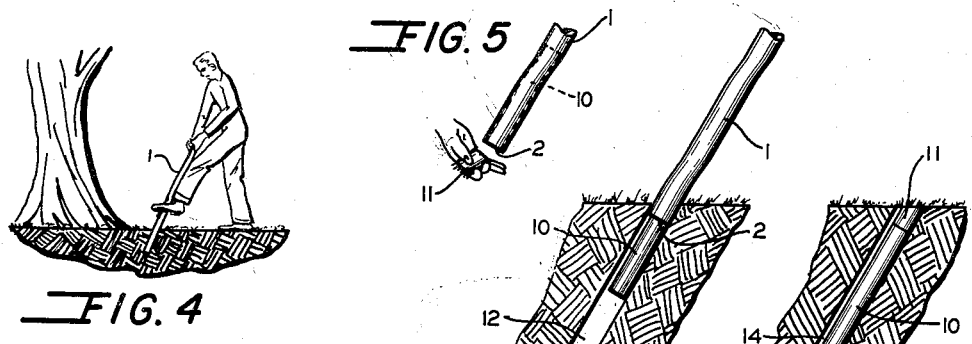
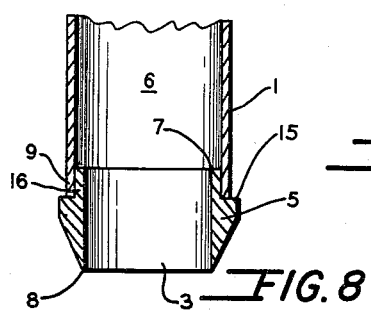
INVENTOR.
LLOYD E. WESSEL
BY *Wm. R. Price*
ATTORNEY

United States Patent Office 3,113,534
Patented Dec. 10, 1963

3,113,534
ROOT FEEDING TOOL AND METHOD
Lloyd Edward Wessel, 2810 Meadow Drive,
Louisville, Ky.
Filed Aug. 11, 1961, Ser. No. 131,000
2 Claims. (Cl. 111—89)

This invention relates to a root feeding tool. More specifically, this invention relates to a tool which facilitates the incorporation of plant food in proximity to the feeding roots of the root system without damaging the sod or turf.

Heretofore, there have been many methods for applying plant food to trees, shrubbery, small plants and like. These methods have not been without difficulties in that most of the fertilizer elements, and especially phosphorus and to a lesser extent potash tend to remain in the location of placement and do not move through the soil readily. For this reason, and due to the fact that feeder rots tend to grow in the direction of the food, surface application of the fertilizer is undesirable. Trenching has been applied in some areas in an effort to place the plant food in a closer relationship to the root system. However, this system is disadvantageous in that the lawn or turf is greatly damaged; the effective area of nutrient incorporation is relatively small and a goodly number of the roots are damaged in the digging of the trench. This has led to the development of the punch bar system wherein a great number of holes are punched in the ground surrounding the tree and the plant food is placed in said holes. In order to effect good distribuiton of plant food, it is necessary to punch a good number of holes which tend to damage the grounds and sod. In order to overcome this latter difficulty, some operators have utilized auger type drills or compressed air apparatus. However, auger type drills are not suitable for use in wet or muddy ground and compressed air apparatus is expensive.

The area to be fertilized is somewhat in proportion to the size of the tree. Thus, the radial spread of the root system of a tree having a trunk of about ten inches in diameter will be in the neighborhood of ten feet. The optimum feeding area of this root system lies mostly in the outer three fourths of the area covered by the root system. Nutrients are absorbed in liquid form primarily by the small root hairs or feeding roots. These are located in the upper two feet of soil. Consequently, the feritlizer should be applied to the area which comprises the outer three fourths of the radial distance of the root system at a depth of from 12 to 24 inches. This will vary somewhat, depending upon the tree's size, species, variety, etc. Generally speaking, the amount of fertilizer varies in relation to the size of the tree and ranges in quantity from two to four pounds for each inch of diameter of the trunk. Thus, for example, a tree having a trunk ten inches in diameter should receive from twenty to forty pounds of dry fertilizer. Since most ornamental trees grow normally in acid soil, fertilizers which contain soil sweetening constituents such as lime should be avoided. Normally, a heavy nitrogenous formula such as a 10:8:6 (nitrogen:phosphorus:potash) should be utilized; although for some evergreens organic nitrogen compounds are suggested as for example, horse manure, tankage or guano.

In view of these considerations, it is necessary to apply fertilizer to an area comprising the outer three quarters of the root system and at a depth of from eighteen to twenty-four inches deep. This is accomplished by a series of holes, each 12 to 24 inches deep, and from 1 to 2 feet apart in circles around the trunk of the tree. The circles should be between one and two feet apart. For best distribution, the holes in adjacent circles should be staggered in such a manner that the hole of an adjacent circle will be about equidistant between the holes of a preceding circle and the holes of a successive circle. The plant food is then applied to the hole and the area watered extensively.

Accordingly, it is an object of this invention to provide apparatus which may be used to incorporate fertilizer in an arboreal root system without appreciably damaging the turf or sod.

Another object of this invention is to provide a tool for applying plant food to a root system whereby the soil surrounding the place of insertion of said plant food is not unduly compacted.

A further object of this invention is the provision of a tool which is light, sturdy and economical, the use of which will provide a method for incorporating plant food in close proximity to the root system and provide a water channel for provision of water to dissolve said nutrients.

Still another object of this invention is to provide a series of water channels leading to the feeder roots of an arboreal root system for successive waterings of said root system.

A further object of this invention is the provision of a tool for use in removing an earth core and by inverting said tool returning the earth core to the hole from which it came through the extended unobstructed discharge end thereof.

Other objects of this invention will be apparent to those skilled in the art from the detailed description which follows.

These desiderata are accomplished by the use of my improved root feeding tool which comprises a tube having a cutting end, a projecting bar or arm by means of which foot pressure can be applied and an open end whereby the core of soil may be delivered back to the hole, in the ground. Thus the cutting edge of the tool is placed on the ground; the tool is driven by foot pressure at a distance of about 18 to 24 inches into the ground, the tool is manipulated and removed containing a core. Fertilizer is placed into the hole and the core is returned to the hole.

By reason of the fact that the bore of the cutting end of the tube is of smaller diameter than the diameter of the tube per se, the earth core is of smaller diameter and is easily reinserted in the hole by simply inverting the instrument. Nevertheless, compacting of the soil adjacent to the walls of the hole is kept to a minimum thus allowing better distribution of the water soluble fertilizer constituents upon addition of water which tends to seep downwardly in the channel left between the wall of the hole and the surface of the core. The invention will be better understood by reference to the drawings and description of the invention which follows.

Referring now to the drawings, FIG. 1 is a side elevation of the apparatus of this invention.

FIG. 2 is a transverse section taken along lines 2—2 of FIG. 1.

FIG. 3 is an enlarged fragmentary vertical section taken along lines 3—3 of FIG. 1.

FIG. 4 is a pictorial view illustrating the use of the tool in proximity of a tree.

FIG. 5 is a fragmentary view of the discharge end of the tool, illustrating how the turf end of the core may be broken off as the core is removed.

FIG. 6 illustrates the insertion of the core into the earth hole by inverting the tool so that the discharge end fits directly over the hole.

FIG. 7 is a sectional view of contents of the earth hole, illustrating a layer of fertilizer, the body of the core and the turf end of the core.

FIG. 8 is a fragmentary vertical section, illustrating a modified cutting end of the tool.

The tool comprises a tubular member, 1, a discharge end 2, and a cutting end comprising a cutting member 5. The cutting member consists of a sharp chisel like edge 8, a shoulder portion 5 and a portion 16 which is pressure fitted into the wall 9 of tubular member 1.

This tends to expand the wall 9 of the tubular member slightly at this point so that the circumference of the cutting end is slightly larger than the circumference of the body of the tool. This insures a hole which is larger than the body of the tool. This minimizes friction between the walls of the hole 12 and the tool upon insertion of the tool in the ground and minimizes suction upon withdrawal of the tool containing the core from the ground. Portion 16 of the cutting member forms a slight ledge 7 which defines the difference between the bore 3 of the cutting member 5 and the bore 6 of the tubular member 1. This is best illustrated in FIG. 2. Foot support 4 is in the illustrated modification merely a piece of steel welded to the body of the tubular member.

The operation of the tool is illustrated in FIG. 4 whereby the tube 1 is inserted into the ground by application of foot pressure on to foot support 4. The point of insertion should be at least 2 to 3 feet away from the trunk of the tree to avoid injury to the root collar and trunk base.

After the core 10 is removed from the ground, it is held in the tubular member by reason of the smaller bore 3 of the cutting member 5. The tool is inverted. Finger pressure applied to the end of the core 10 will dislodge it so that it will be discharged from the discharge end 2 of the tool. In FIG. 5 this is illustrated with the turf end 11 of the core 10 being broken off as the core emerges from discharge end 2 of the tool. Fertilizer 13 is added to earth hole 12 and the body 10 of the core is inserted therein by placing the discharge end 2 of the tool over the mouth of the hole 12. This is illustrated in FIG. 6. The sod or turf end 11 of the core is then placed therein, turf side up as is shown in FIG. 7. The channel 14 between the core 10 and the walls of hole 12 provides a waterway through which water may seep to reach fertilizer 13. Since a portion of the core is replaced by fertilizer it is sometimes advisable to add water before the core is reinserted. However, in most cases, watering of the area afterwards will dissolve the fertilizer so as to be suitable for absorption by the feeder roots and the cores will sink back into position. Furthermore, water channels will remain in the area of the arboreal root system for subsequent waterings.

A larger channel 14 may be provided by the use of the modified cutting member, illustrated in FIG. 8. In this member, shoulder 15 projects laterally from wall 9 of tube 1. This provides for a larger diameter hole 12 than the diameter of the core 10. It also minimizes friction between the walls of the hole 12 and the walls of the tube 1 and minimizes suction which might develop upon removal of the tool.

It is obvious that the cutting end might comprise a "necked" down end of tubular member 1. This would be cheaper, however this member would not be replaceable as are the cutting members, illustrated in FIGS. 3 and 8.

In operation, a series of circles are made starting about two feet from the base of the trunk. Successive circles should be made about one foot apart until the last circle is slightly beyond the spread of the outermost branches. A series of holes, varying in depth from 12 to 24 inches should be made by applying the cutting edge 8 of the tubular member 1 into the ground by applying a downward pressure with the foot on the foot support 4. For best results, the instrument should be inserted at a slight angle with the end of the instrument slanted toward the tree. After the correct depth is reached, the instrument is rotated or moved about to loosen it in the hole and the instrument is withdrawn containing the core within the tubular member 1. Sometimes it is advantageous to add plant food to the open end of the tubular member at this point so that this end may be inverted and used as a funnel to pour the plant food into the hole. Thereafter, the tubular member is raised in the air; finger pressure is applied to the end of the core at the cutting edge 8, and the core 10 is caught with the right hand as it slides out of the discharge end 2 of the tubular member, and three to four inches of the sod end of the core is torn loose. The remainder of the core is inserted into the hole and the sod plug is placed on top, sod side up. In this manner, there is no evidence, to the casual observer, that a hole has been made. Due to the fact that the cutting bore is smaller than the internal bore of the tubular member, the core is held in position until light finger pressure is applied to remove it. For this reason, the fertilizer may be applied to the open end of the tube at a convenient waist height, rather than pouring the fertilizer directly into the hole. Furthermore, the fertilizer may be applied through the open end of the tube without the core being released until desired.

Since it is necessary for the various constituents to be in solution in order to be absorbed by the hair roots of the root system, it is good practice to thoroughly saturate the ground with water after the dry fertilizer has been incorporated. The channel 14, between the core 10 and the wall of the hole 12, thus allows for water to drain from above, and since the core has been removed with almost surgical incisiveness, the earth has not been unduly compacted. Therefore the water containing the valuable nutrients is free to become dispersed in the surrounding earth. Normally, the water tends to move vertically rather than laterally in the ground and for this reason, the diagonally disposed holes and the lack of compacting due to the incising of the earth core allows for maximum lateral dispersion of the water soluble nutrients.

It will be understood, of course, that the implement may be made in different sizes and shapes. Normally, however, the earth hole should not be less than 1 inch in diameter but should not exceed about 3 inches in diameter.

Many modifications in construction of the instrument may be made so that a handle may be added to the top portion of the tube or two foot bars may be placed at another portion of the tube; or, for example, provision may be made for adjusting or positioning of the foot bar away from the cutting end of the tube, to compensate for varying depths necessary for the various species and varieties of trees.

Many other improvements and embodiments may be made in the tool disclosed herein without departing from the spirit and scope of the invention.

Having now described the invention, what is claimed is:

1. In a process for applying plant food in close proximity to the feeder roots of an arboreal root system, in which a series of holes are formed in circles about 1 foot distant from each other in the outer three quarters of said root system, and to which holes plant food is added, the improvement which comprises the sequential steps of forming a hole 12 to 24 inches deep by removing an earth core of smaller diameter but of equal length to said hole, adding plant food to said hole and thereafter breaking off about 3 to 6 inches of the turf end of said core, inserting a substantial portion of the remainder of the core in said hole substantially intact to form a water channel between the walls of said hole and said core and then inserting the turf end therein turf side up and thereafter drenching the area with water, whereby water runs downwardly in the channel between the core and the walls of the hole to partially put the plant food into solution for absorption by said feeder roots.

2. In a tubular root feeding tool, adapted in its upright position to cut an earth core to form an earth hole for addition of plant food thereto, said tool comprising: an elongated tubular portion, an unobstructed discharge and guide orifice at the upper terminal end of the tubular portion and a hollow cutting member at the lower terminal end of the tubular portion, in combination with means for applying vertical pressure to said tubular portion, in which:

(a) said means for applying vertical pressure is attached to said tubular portion in an area substantially intermediate to the upper terminal end and the lower terminal end of said tubular portion, said means extending laterally from said tubular portion so that the tubular portion extends materially above and below said means;

(b) said tubular portion has an unobstructed bore throughout, no larger in diameter than the diameter of the discharge and guide orifice so that said tool may be inverted to place the discharge and guide orifice into an earth hole to guide an earth core into said hole; and (c) said hollow cutting member has an internal surface, an external surface, and a cutting orifice, said cutting orifice having an internal diameter no larger than the diameter of the remainder of the cutting member at any point across its internal surface but smaller in diameter than the diameter of the bore of said tubular portion;

whereby an earth core may be held intact in the lower terminal end of the tool while the tool is in inverted position until released by finger pressure.

References Cited in the file of this patent

UNITED STATES PATENTS

| | | |
|---|---|---|
| 563,195 | Lyon | June 30, 1896 |
| 1,997,097 | Bartlett | Apr. 9, 1935 |
| 2,210,440 | Avary | Aug. 6, 1940 |
| 2,439,524 | Moore | Apr. 13, 1948 |
| 2,505,174 | Daniels | Apr. 25, 1950 |
| 2,612,725 | Casey | Oct. 7, 1952 |
| 2,686,690 | Kushnir | Aug. 17, 1954 |
| 2,708,593 | Benoist | May 15, 1955 |

FOREIGN PATENTS

| | | |
|---|---|---|
| 270,205 | Great Britain | May 5, 1927 |
| 522,286 | Great Britain | June 13, 1940 |
| 616,642 | Great Britain | Jan. 25, 1949 |